US010597281B2

(12) United States Patent
Chhabra (10) Patent No.: US 10,597,281 B2
(45) Date of Patent: Mar. 24, 2020

(54) METHODS AND SYSTEMS TO RECORD THE FLOW OF A LIQUID USING AN ELECTRONIC POURER

(71) Applicant: Absolute Minds LLC, Mountain View, CA (US)

(72) Inventor: Rohit Chhabra, Mountain View, CA (US)

( * ) Notice: Subject to any disclaimer, the term of this patent is extended or adjusted under 35 U.S.C. 154(b) by 221 days.

(21) Appl. No.: 15/413,373

(22) Filed: Jan. 23, 2017

(65) Prior Publication Data

US 2018/0201494 A1 Jul. 19, 2018

Related U.S. Application Data

(63) Continuation of application No. 15/410,626, filed on Jan. 19, 2017.

(51) Int. Cl.

| | |
|---|---|
| *G01C 19/00* | (2013.01) |
| *B67D 3/00* | (2006.01) |
| *G06Q 10/08* | (2012.01) |
| *G01C 21/16* | (2006.01) |
| *G01C 19/02* | (2006.01) |
| *G01D 9/00* | (2006.01) |

(52) U.S. Cl.
CPC ......... *B67D 3/0041* (2013.01); *B67D 3/0051* (2013.01); *G01C 19/02* (2013.01); *G01C 21/165* (2013.01); *G01D 9/00* (2013.01); *G06Q 10/087* (2013.01); *B67D 3/0077* (2013.01); *B67D 2210/00091* (2013.01)

(58) Field of Classification Search
USPC ..................................................... 73/504.08
See application file for complete search history.

(56) References Cited

U.S. PATENT DOCUMENTS

| | | | |
|---|---|---|---|
| 5,379,916 A | 1/1995 | Martindale et al. | |
| 5,505,349 A | 4/1996 | Peckels | |
| 6,123,225 A | 9/2000 | Peckels | |
| 8,608,026 B1 * | 12/2013 | Temko ................. | B67D 3/0051 222/1 |

(Continued)

FOREIGN PATENT DOCUMENTS

EP 2091858 B1 1/2011

OTHER PUBLICATIONS http://www.wunderbar.com/dispensing/beverage-dispensing/liquor-dispenser/skyflo.

*Primary Examiner* — Rodney E Fuller
(74) *Attorney, Agent, or Firm* — Chhabra Law Firm, PC (57) ABSTRACT

An electronic pourer can be used with an inventory system for inventory and/or accounting purposes. In one embodiment, the electronic pourer includes an orientation determining subsystem configured to determine an orientation of the electronic pourer, a wireless communication subsystem, a processing subsystem having at least one processing core, and a power source configured to power up the electronic pourer. The processing subsystem can be coupled to the orientation determining subsystem and the wireless communication subsystem to determine whether liquid has been dispensed from the electronic pourer based on the angular displacement of the orientation determining subsystem, and transmit information to an external computing device via the wireless communication subsystem. In another embodiment, the electronic pourer is equipped with a subsystem.

20 Claims, 9 Drawing Sheets

(56) References Cited

U.S. PATENT DOCUMENTS

| | | | |
|---|---|---|---|
| 8,925,769 B2 | 1/2015 | Zapp et al. | |
| 8,961,781 B2 * | 2/2015 | Ma | C02F 1/003 |
| | | | 116/264 |
| 9,212,041 B2 | 12/2015 | Keating et al. | |
| 9,302,826 B2 * | 4/2016 | Brower | B65D 47/06 |
| 2008/0133150 A1 * | 6/2008 | Mogadam | B67D 1/00 |
| | | | 702/45 |
| 2008/0195251 A1 | 8/2008 | Milner | |
| 2008/0272147 A1 | 11/2008 | Buker | |
| 2010/0038378 A1 | 2/2010 | Gabler et al. | |
| 2011/0166699 A1 * | 7/2011 | Palmquist | B67D 1/1234 |
| | | | 700/236 |
| 2011/0180563 A1 * | 7/2011 | Fitchett | B67D 3/0051 |
| | | | 222/1 |
| 2011/0309103 A1 * | 12/2011 | Heatherly | B65D 47/32 |
| | | | 222/52 |
| 2012/0211516 A1 | 8/2012 | Zapp et al. | |
| 2014/0312060 A1 * | 10/2014 | Heatherly | B67D 3/0041 |
| | | | 222/23 |
| 2014/0346198 A1 * | 11/2014 | Bond | G01F 11/265 |
| | | | 222/641 |
| 2015/0355012 A1 * | 12/2015 | Gurumohan | A47G 19/00 |
| | | | 702/55 |

* cited by examiner

METHODS AND SYSTEMS TO RECORD THE FLOW OF A LIQUID USING AN ELECTRONIC POURER

CROSS REFERENCE TO RELATED APPLICATIONS

The present application is a continuation of, and claims priority from, co-pending U.S. patent application Ser. No. 15/410,626, filed on Jan. 19, 2017.

FIELD OF THE INVENTION

Embodiments of the present invention relates generally to recording and tracking the flow of liquids. More particularly, embodiments of the invention relate to recording the determination of flow of liquids through an electronic pourer (dispenser) for inventory management and/or accountability.

BACKGROUND OF THE INVENTION

In the alcoholic beverage serving industry, bartenders are employed to serve alcoholic beverages. Generally, bartenders are professionals who prepare alcoholic beverages for patrons in the service and restaurant industry. At least in the United States (US), distilled spirits and/or liquors are often measured in terms of a 'shot', generally defining one distilled spirit beverage having one shot of spirit. Depending on the geographic location, a shot of distilled spirit can vary. For example, in the US a shot is generally defined comprising between 1.25-1.5 US fluid ounces (37-44 milliliters) of the distilled spirit or liquor.

Customarily, while preparing an alcoholic beverage, a bartender will pour the spirit/liquor using a pourer (also known as a dispenser). Pourers are used for efficiency and uniformity while preparing drinks. This is because a pourer standardizes the flow of a liquid (which would otherwise be dependent on the opening of the bottle), thus giving the bartender uniformity over the time it takes to pour the spirit, resulting in efficiency. Although bartenders can also use a shot glass or measuring cup to determine the volume of the spirit or liquor introduced to a beverage, often bartenders may, intentionally or unintentionally, over-pour the spirit. Over pouring means that more than a shot of spirit or liquor has been introduced in a beverage, while charging the patron for a shot. This usually results in financial loss to bar owners and/or operators. Although, bar operators and managers use an inventory system to keep track of the amount of alcohol consumed, there is generally a problem tracking the employee(s) who cause the over-pour.

Therefore, what is needed are systems, apparatus, methods, and techniques, that can identify when an alcoholic spirit/liquor is being poured along with other pertinent information that can assist a bar manager/operator to track inventory of the spirit/liquor and/or provide data for accountability purposes.

SUMMARY OF THE DESCRIPTION

Using various embodiments, an electronic pourer to dispense a liquid, is described. In one embodiment, the electronic pourer includes an orientation determining subsystem configured to determine an orientation of the electronic pourer, a wireless communication subsystem to communicate with an external computing device, and a processing subsystem having at least one processing core that is coupled to the orientation determining subsystem and the wireless communication subsystem. In one embodiment, the processing subsystem of the electronic pourer can be configure to determine whether liquid has been dispensed from the electronic pourer, based on the orientation of the electronic pourer, and transmit electronic pourer data to an external computing device, via the wireless communication subsystem.

In one embodiment, the orientation determining subsystem includes a gyroscope. The orientation determining subsystem can, in one embodiment, determine an orientation of the electronic pourer, including an angular rotation about at least one of an X-axis, Y-axis, or Z-axis of the electronic pourer. In one embodiment, processing subsystem can be configured to receive the angular rotation about the X-axis, Y-axis, and/or Z-axis of the electronic pourer from the orientation determining subsystem, and based on the angular rotation, determine whether liquid has been dispensed from the dispensing chamber.

The electronic pourer data, in one embodiment, includes at least one of a binary flag indicating the determination that liquid has been dispensed from the dispensing chamber, a timestamp value of the determination that liquid has been dispensed from the dispensing chamber. The electronic pourer can also include a power source configured to supply power to the processing subsystem, orientation determining subsystem, and wireless communication subsystem. In one embodiment, the processing subsystem determines whether liquid has been dispensed from the electronic pourer when the angular rotation of the electronic pourer is between 20 and 180 degrees about an axis. The electronic pourer, in an embodiment, can include a power control switch, configured to turn on or off the electronic pourer. In one embodiment, the electronic pourer comprises a dispensing chamber and an electronics chamber. In one embodiment, the dispensing chamber can be configured to dispense the liquid when the electronic pourer is attached to a bottle/container comprising the liquid, and the electronics chamber can be configured to accommodate electronic components (e.g., orientation determining subsystem, wireless communication subsystem, processing subsystem, power source, etc.) of the electronic pourer. In this embodiment, the electronic chamber does not come in direct contact with the liquid being dispensed. In yet another embodiment, the electronic pourer comprises a single chamber configured to dispense liquid. In the single chamber configuration electronic components are secluded in such a manner that the liquid being dispensed does not come in direct contact with the any electronic component.

In one embodiment, electronic pourer can also include a tamper-proof subsystem, configured to determine whether the electronic pourer has been at least one of coupled or decoupled from the bottle. In one embodiment, the processing subsystem can be further configured to transmit a timestamp or binary flag representing at least one of an activation or deactivation of the tamper-proof subsystem, or a combination thereof, to the external computing device upon coupling or decoupling from the bottle. In one embodiment, the tamper-proof subsystem is configured to transmit data representing the activation of the tamper-proof subsystem upon coupling with the bottle and further can be configured to transmit data representing the deactivation of the tamper-proof subsystem upon decoupling with the bottle. In yet another embodiment, the tamper-proof subsystem includes a switch residing on the electronic pourer that turns on upon coupling with the bottle. The switch in one embodiment can be configured to reside underneath a seal of the electronic pourer, the seal preventing liquid from seeping out of the bottle when the electronic pourer is coupled with the bottle.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Although embodiments herein are described with the electronic pourer coupled with a bottle of spirit or liquor, it should be noted such embodiments are for exemplary purposes only; a person of ordinary skill in the art would appreciate that the electronic pourer described herein can be used with any container comprising any liquid (or in some instances solid) substance that may need a pourer to dispense.

Figure 1A:
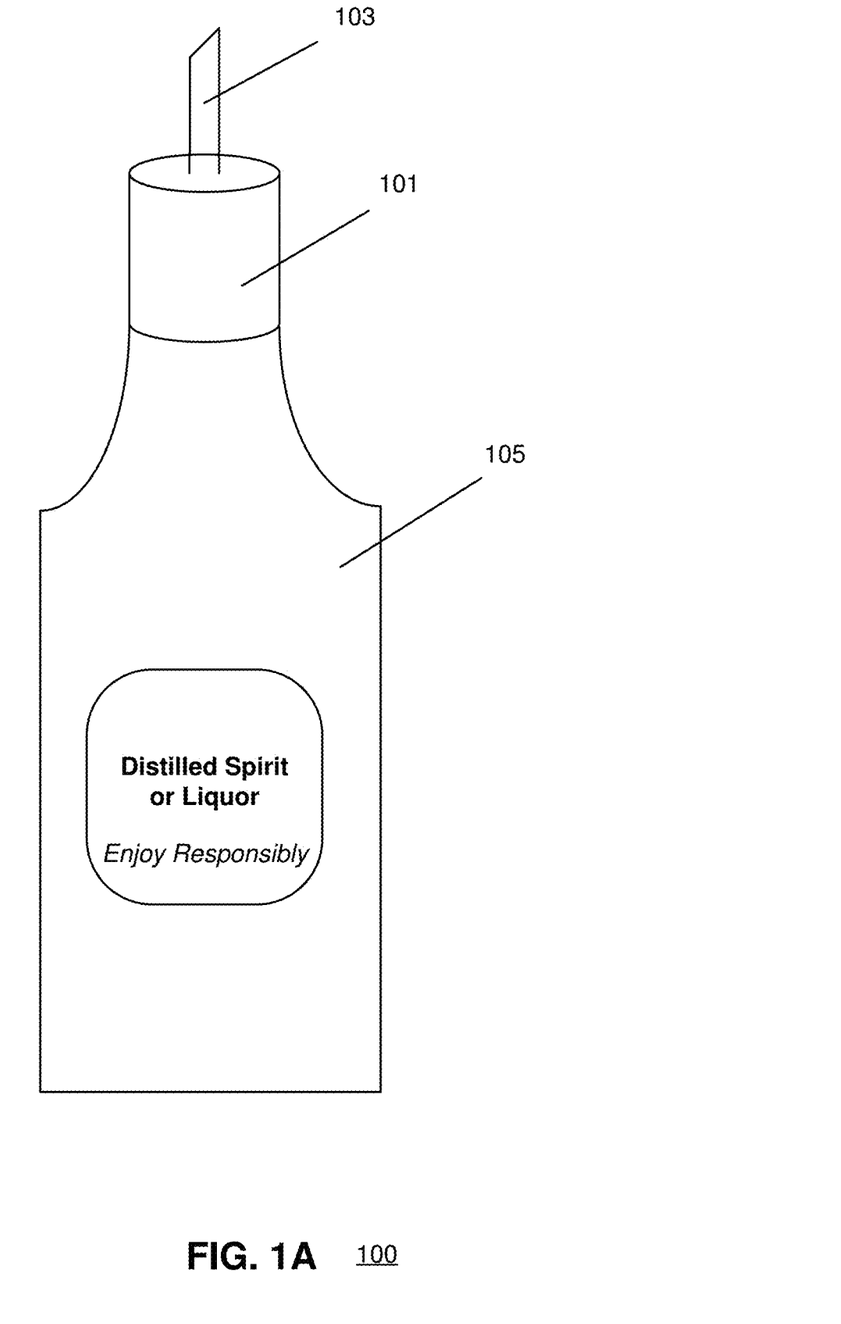
FIG. 1A illustrates diagram of an embodiment of an electronic pourer coupled to a bottle, according to one embodiment of the present invention.

FIG. 1A illustrates diagram 100 of an embodiment of an electronic pourer coupled to a bottle, according to one embodiment of the present invention. As illustrated electronic pourer 101 is coupled to container 105. In one embodiment container 105 can be a liquor or spirit bottle. Electronic purer 101 can also have pouring spout 103 attached to it to conveniently pour the liquid in container 105. Container 105 can, in one embodiment, have a liquor or spirit as the liquid inside it. Not shown, but present, are also a 'breather' (hole/tube allowing air back into the bottle) and 'seal' (so that the contents of the bottle do not leak/seep out from the side while pouring). Although pouring spout 103 is illustrated as a generic spout, in various embodiments, the spout (and/or seal) can include multiple configurations (e.g., standard pourer, tapered pourer, screened pourer, ball pourer, etc.), as known to a person of ordinary skill in the art.

Figure 1B:
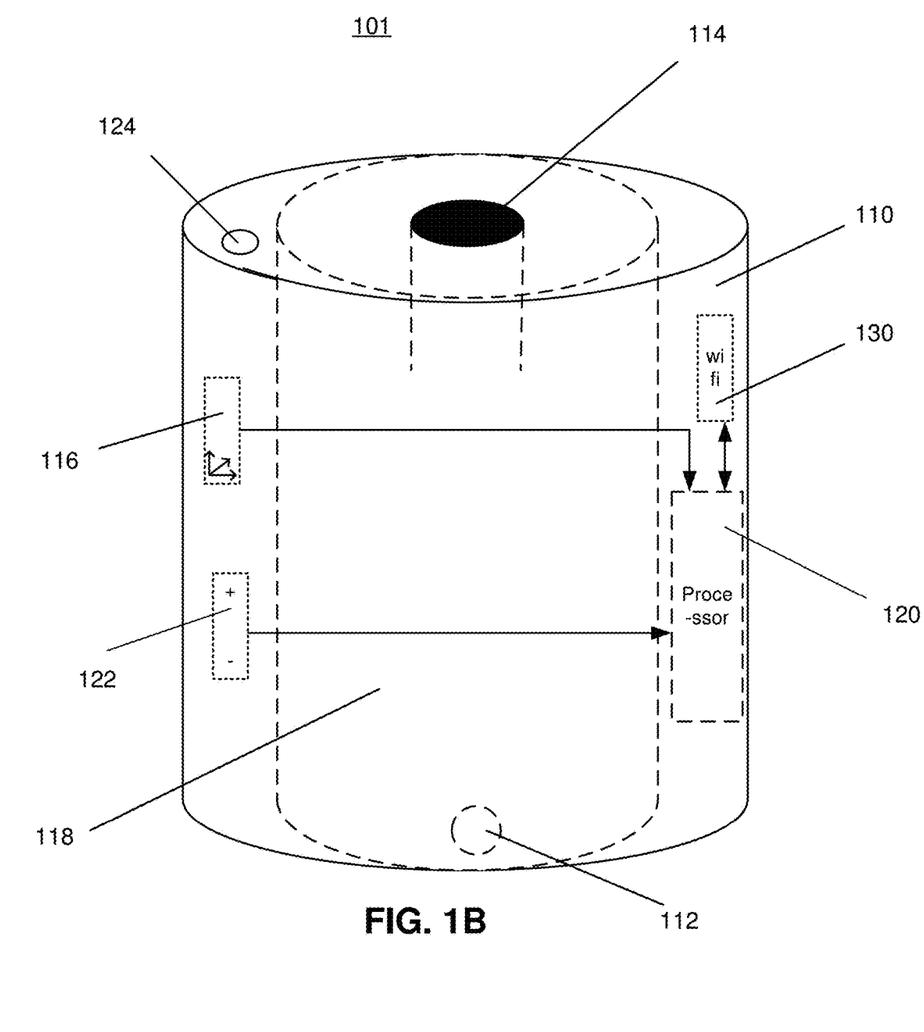
FIG. 1B illustrates the electronic pourer, according to one embodiment of the present invention.

FIG. 1B illustrates the electronic pourer 101, according to one embodiment of the present invention. As illustrated, in one embodiment, electronic pourer comprises a dispensing chamber 118 and an electronics chamber 110. Although dispensing chamber 118 (demarcated with a dashed line) is configured to be bound within electronic chamber 110, such an embodiment is for illustrative and exemplary purposes only. Dispensing chamber can have an outlet 114 to dispense liquid into a beverage. Accordingly, outlet 114 can be configured to accommodate pouring spout 103, in one embodiment of the present invention. In yet another embodiment, electronic pourer 101 comprises a single chamber configuration which is used to dispense liquid and also includes the electronic components otherwise present in electronic chamber 110. In such a configuration, each electronic component is secluded in such a manner that the liquid being dispensed does not come in direct contact with any electronic component. In an alternative embodiment, separate electronic chambers comprising at least one electronic component are configured within or around dispensing chamber 118. Thus, in this embodiment, electronic chamber 110 can be split into a plurality of chambers that can be placed on either side of dispensing chamber 118. In any embodiment, dispensing chamber 110 and electronics chamber 110 can have any configuration as long as the two chambers are separated so that electronics chamber 110 does not come in direct contact with the liquid being dispensed within dispensing chamber 118.

In one embodiment, electronics chamber 110 can be configured to include orientation determining subsystem 116 to determine an orientation of electronic pourer 101, processing subsystem 120, wireless communication subsystem 130, and power source 122 (e.g., battery). In a preferred embodiment, a System-On-Chip (SOC) optimized for Internet-of-things (IOT) can be employed to combine the functionality of processing subsystem 120, wireless communication subsystem 130, and or orientation determining subsystem 116. In the case when an SOC is employed, other features (e.g., power saving features), can also be employed to extend power source life offered by power source 122. In other embodiments, any of the electronic subsystems required by electronic pourer 101 can be implemented in one or more silicon wafers (e.g., integrated micro-controllers/systems).

In another embodiment, electronic pourer 101 can include tamper proof subsystem 126 that can indicate that the inventory system has been comprised or data transmitted by electronic pourer will not be accurate due to an intentional or unintentional mischief or action. In one embodiment, tramper proof subsystem 126 (shown as a dashed circle) can be placed on the inner side of dispensing chamber 118 such that, a switch or button is activated when it comes in contact with a bottle or container. As illustrated, tamper-proof subsystem 126 includes a switch or button strategically placed on the inner side of dispensing chamber 118 which can be depressed when electronic pourer 101 is coupled to a bottle or container. In one embodiment, tamper-proof subsystem transmits a notification to an external computer of an inventory system upon coupling or decoupling of electronic pourer 101 with a bottle or container, as further described herein.

In one embodiment, electronic pourer 101 can include visual indicator 124 (e.g., Light Emitting Diode) to display the status of electronic pourer 101. Thus, in one embodiment, processing subsystem 120 can transmit different visual signals to an operator/bartender using visual indicator 124 to indicate a status alert. For example, in one embodiment, visual indicator 104 can turn on when power source is running low, when electronic pourer 101 is (wirelessly) connected to an inventory system and coupled to a container/bottle, when electronic pourer 101 is disconnected from an inventory system and decoupled from the container/bottle, or a combination thereof. Visual indicator 124 can be used to display system alters, notifications, etc. to the bartender or when some action is required. In one embodiment, a computing device of an inventory system can transmit data to electronic pourer 101 and instruct electronic pourer to turn on visual indicator 124.

Figure 2:
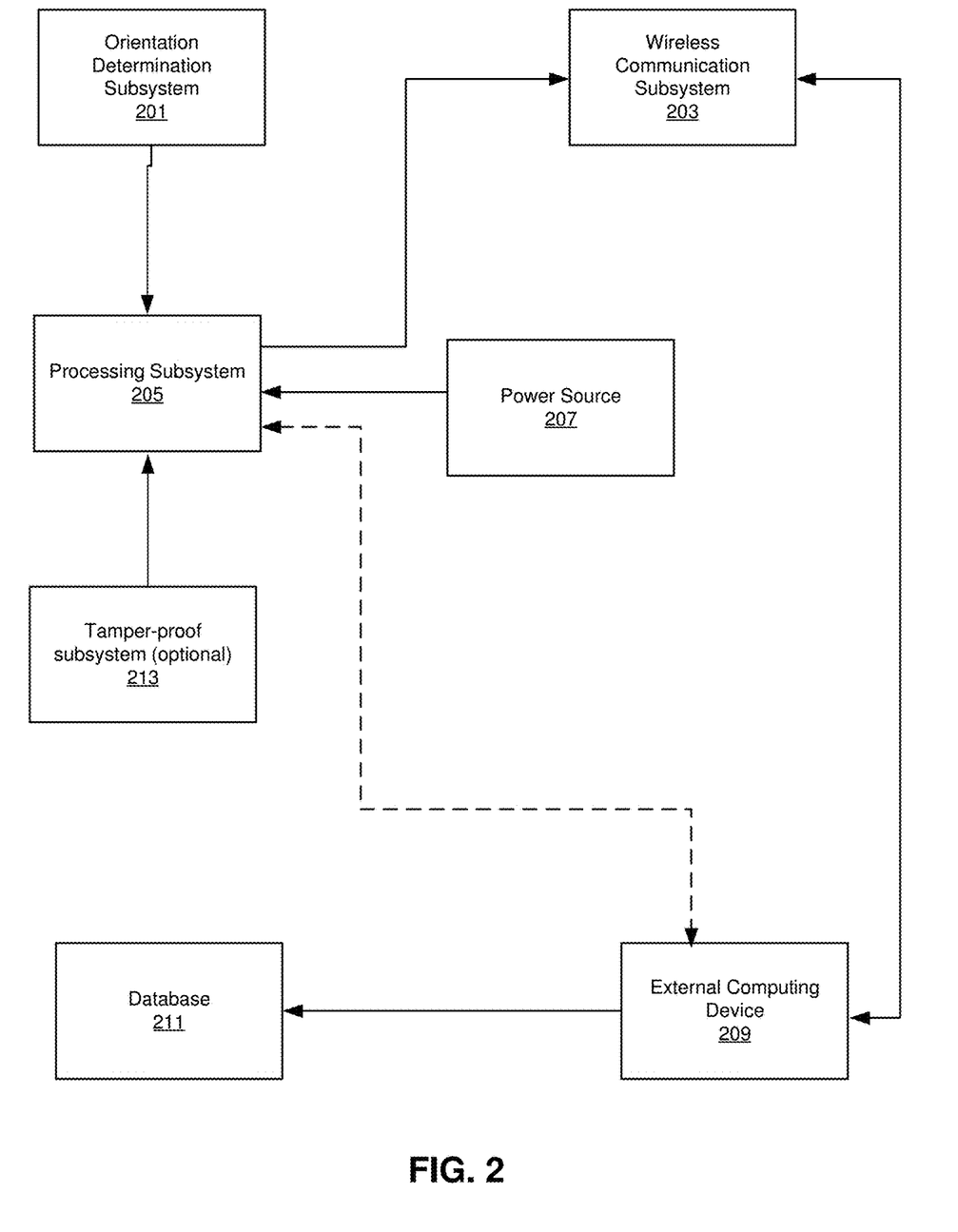
FIG. 2 illustrates the electronic components required by an electronic pourer, according to one embodiment of the present invention.

FIG. 2 illustrates the electronic components required by an electronic pourer, according to one embodiment of the present invention. In one embodiment, electronic pourer 101 an orientation determining subsystem 201 configured to determine an orientation of electronic pourer 101. Orientation determining subsystem 201 can transmit the orientation, including an angular displacement (rotation) about at least one of an X-axis, Y-axis, or Z-axis of the electronic pourer, to processing subsystem 205 (having at least one core). Further, processing subsystem 205 of electronic pourer 101 can also include wireless communication subsystem 203, to communicate with external computer device 209 of an inventory system. Wireless communication subsystem 203 can include any wireless communication device (e.g., Bluetooth, Wi-Fi, Wi-Max, etc.). In one embodiment, processing subsystem is coupled to the orientation determining subsystem and the wireless communication subsystem.

Processing subsystem 205, in one embodiment, is configured to receive an angular rotation about the at least one of the X-axis, Y-axis, or Z-axis of the electronic pourer from the orientation determining subsystem 201. Thereafter, based on the angular rotation, processing system is configured to determine whether liquid has been dispensed from the dispensing chamber 118. For example, in one embodiment, if the angular rotation about an axis is between 20 and 180 degrees then it can be presumed that electronic pourer has performed a pour action. In one embodiment, orientation determining subsystem 201 can include a gyroscope. In another embodiment, orientation determining subsystem 201 can also include an accelerometer to distinguish between a pour action and a rigorously shaken movement of electronic pourer 101, since, in one embodiment, sudden movements or jitters recorded by the accelerometer can be considered as noise and prevent falsely determining a pour action. Once a pour action has been determined, processing subsystem 205 can determine that liquid has been dispensed from the dispensing chamber 118 and transmit, via the wireless communication subsystem 203, electronic pourer data to external computing device 209, the electronic pourer data including identification data associated with the electronic pourer. Electronic pourer data can, in one embodiment, further include, a binary flag indicating the determination that liquid has been dispensed from the dispensing chamber 118. In another embodiment, electronic pourer data can include a timestamp value of the determination that liquid has been dispensed from the dispensing chamber. External computing device 209 can be configured to be a part of an inventory system to record all information received by electronic pourer 101 to database 211. Further, electronic pourer 101 can also include power source 207 that is configured to supply power to processing subsystem 205, orientation determining subsystem 201, and/or wireless communication subsystem 203.

In one embodiment, electronic pourer 101 can also include tamper-proof subsystem 213 configured to determine whether the electronic pourer has been coupled and/or decoupled from a container/bottle. In this embodiment, processing subsystem 205 can be configured to transmit data representing the activation/deactivation of tamper-proof subsystem 213 upon coupling/decoupling with the bottle, respectively. In this embodiment, processing subsystem 205 can be configured to transmit a timestamp or binary flag representing the activation/deactivation of the tamper-proof subsystem to the external computing device. In one embodiment, tamper-proof subsystem 213 includes a switch/button residing on the electronic pourer that turns on upon coupling with the bottle/container, and turns off upon decoupling with the bottle/container.

Figure 3:
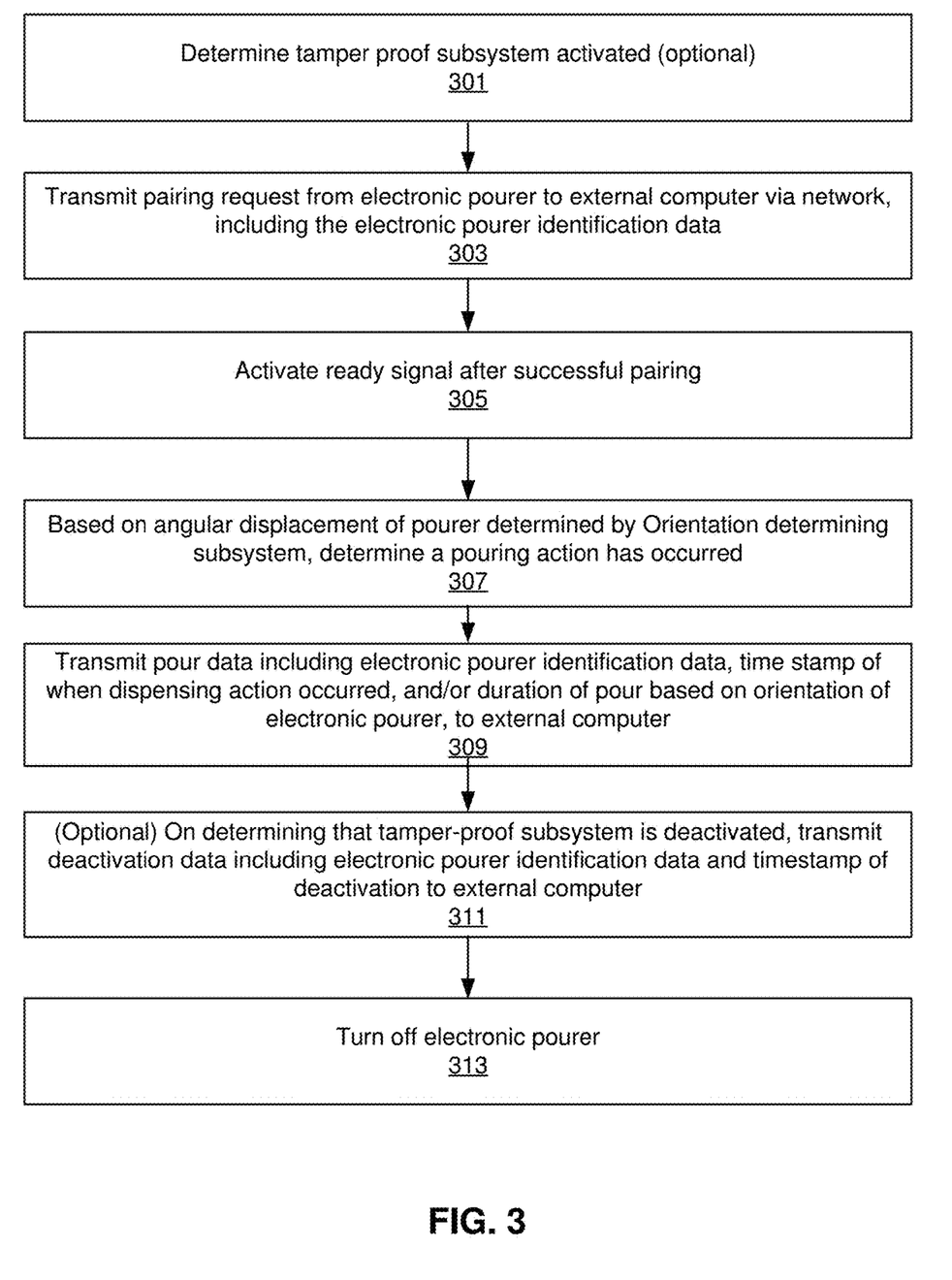
FIG. 3 illustrates the operations performed by an electronic pourer, according to one embodiment of the present invention.

FIG. 3 illustrates the operations performed by an electronic pourer, according to one embodiment of the present invention. As illustrated, in one embodiment, at 301 processing subsystem of electronic pourer determines that tamper proof subsystem has been activated. In another embodiment, tamper proof subsystem can also act as a power 'on' button/switch that activates at least one electronic component, as illustrated in FIG. 1B, of electronic pourer 101. Activation of tamper proof subsystem can be configured such that activation occurs when an electronic pourer couples with a bottle or container. In one embodiment, tamper-proof subsystem can include a switch or button placed on a side of the electronic pourer that includes the seal of the pourer such that the tamper proof switch/button depresses when the electronic pourer seals with the bottle or container. In embodiments which do not include a tamper-proof subsystem, the tamper proof switch/button can be replaced with a power on/off switch configured to turn on or off the electronic pourer.

At 303, in one embodiment, the electronic pourer transmits a pairing request to connect to an external computer of the inventory system via a network. Pairing, as described herein, can include a direct connection (e.g., Bluetooth connection) or indirect connection (e.g., TCP/IP connection) between the electronic pourer and external computing device of an inventory subsystem. Generally, pairing, as described herein, means a direct or indirect connection with or without a network that results in exchange of data between the electronic pourer and external computing device. In an embodiment that includes the tamper-proof subsystem, upon activation of tamper-proof subsystem, processing subsystem of electronic pourer can transmit a timestamp of activation or binary flag (e.g., activation flag) to external computing device after a connection has been established. In embodiments that implement the binary flag, upon receiving the flag indication, external computing system then records the timestamp when the flag is received, into an associated database.

At 305, in one embodiment, after successful pairing, a ready signal is displayed on electronic pourer via visual indicator 124. In one embodiment, orientation determining subsystem transmits the orientation of electronic pourer. At 307, processing subsystem determines, based on the angular rotation of electronic pourer received from orientation determining subsystem, indicating that a dispensing/pouring action has occurred and at 309 electronic pourer transmits pour data including electronic pourer identification data, timestamp of when dispensing action occurred, and/or duration of pour based on orientation of electronic pourer to an external computing device. In an alternative embodiment, instead of the timestamp of when dispensing action occurred, processing subsystem can be configured to transmit a binary flag (e.g., dispense binary flag) indicating the dispensing action. In this embodiment, upon receiving the flag indication, external computing system then records the timestamp when the dispense flag is received, into an associated database.

In one embodiment, any data transmitted from electronic pourer to external computing device comprises the electronic pourer identification data, data or flag determining the type of transmission ('activation', 'deactivation', 'pour initiated', 'pour completed', etc.) and optionally timestamp associated with the transmission. In another embodiment, the duration of a pour is also transmitted to the external computing device. In yet another embodiment, the pour duration is determined by external computing device based on the timestamp difference between each 'pour completed' and 'pour initiated' pair value.

In one embodiment, capturing the duration the orientation of electronic pourer when during a dispensing/pouring action can determine the duration of the pour of the liquor/spirit/liquid. This data can be used to determine the average duration of a pour from a bottle (or multiple bottles) and whether a given pour was above or below the average pour. Since the timestamp of the dispensing action is associated and saved into the database at each pour, managers/owners can determine the employee (based on timekeeping records) whose actions resulted in the below/above average pour. This information can be helpful to a manager/owner of a bar since an above average pour can indicate an over-pour (thus resulting in direct financial loss to the bar) and a below average pour can indicate under-pouring (thus increasing the chances of customer dissatisfaction, and indirectly also contributing or indicating indirect financial loss).

When electronic pourer is decoupled from the bottle, tamper-proof subsystem is deactivated. In one embodiment, upon deactivation of tamper-proof subsystem, electronic pourer can transmit deactivation data including electronic identification data and timestamp of deactivation or binary flag (e.g., deactivation binary flag) to external computing device, at 311. In embodiments that implement the binary flag, upon receiving the flag indication, external computing system then records the timestamp when the flag is received, into an associated database. Thereafter, at 313, electronic pourer can be powered off to conserve battery since it is determined that the pourer is not coupled to the bottle, and thus is not in use.

Figure 4:
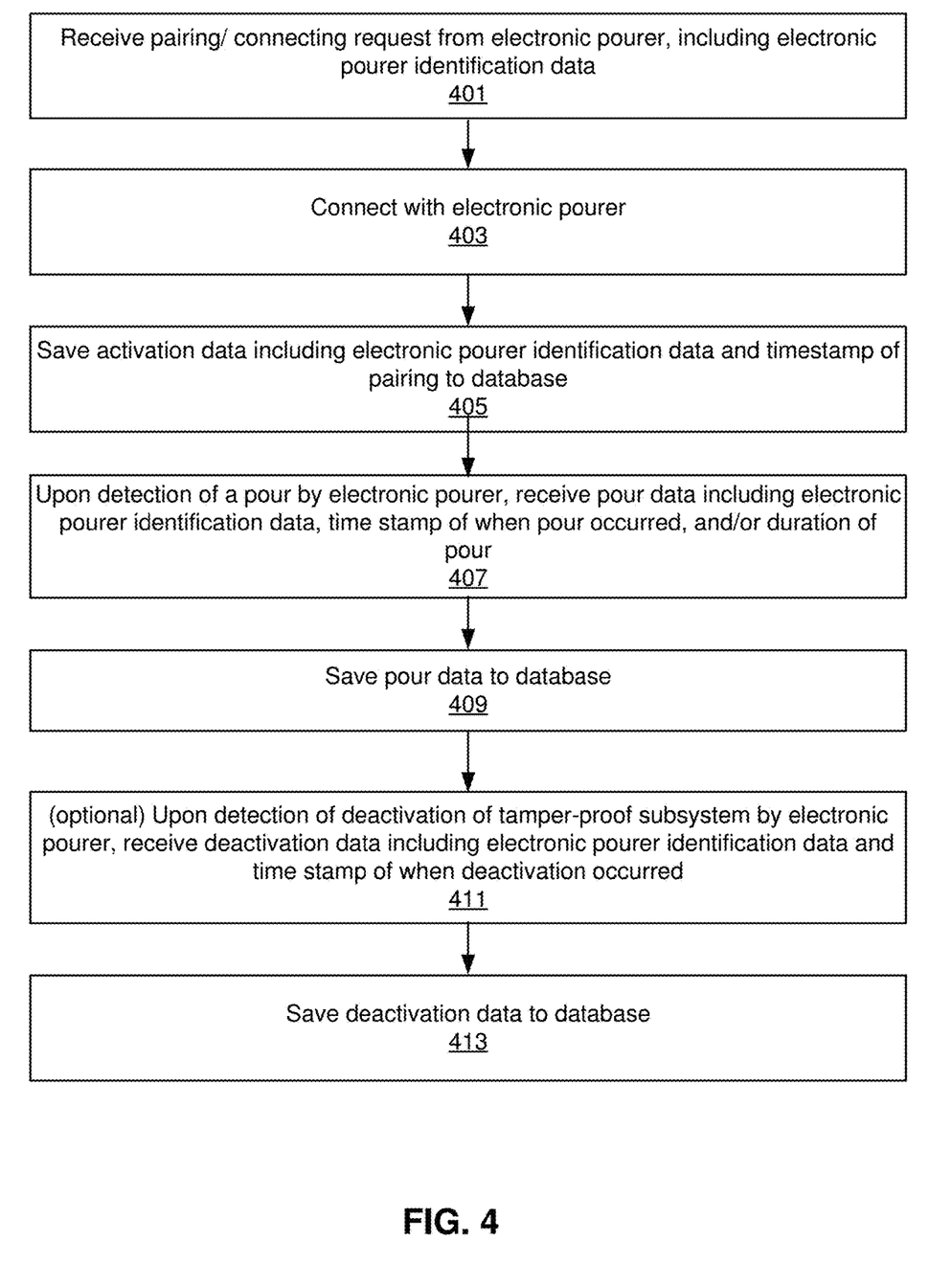
FIG. 4 illustrates the operations performed by an external computing device connected/paired with an electronic pourer, according on one embedment of the present invention.

FIG. 4 illustrates the operations performed by an external computing device connected/paired with an electronic pourer, according on one embedment of the present invention. As illustrated, at 401, external computing device 209, receives a connection request from electronic pourer 101. During the connection request, in one embodiment, an electronic device identification is received by external computing device to identify the electronic pourer. The electronic pourer identification data can include a unique identification tag using which external computing device 209 can identify the electronic pourer. In one embodiment, external computing device can also be configured to store a human readable identifier (e.g., name) customized by an administrative user of the inventory system. Thus, if electronic pourer 101 is coupled to a 750 ml bottle of a particular brand of Vodka, in one embodiment, the human readable identifier can be associated with the electronic pourer identification data and stored in database 211 for future reference. At 403, electronic pourer connects with external computing device using its wireless transceiver. After successful connection is established, at 405, activation data, including electronic identification data and timestamp of connection is saved to database 211. In one embodiment, initiation of connection signifies the activation of the tamper-proof subsystem. Upon determination of orientation of electronic pourer, processing subsystem can, in one embodiment, transmit the timestamp when the pour occurred along with the electronic pourer identification data. In yet another embodiment, another timestamp value can be transmitted when it is determined that the pour has been completed (based on the orientation of the electronic pourer). Using this information, external computing device can calculate the duration of the pour by the electronic pourer, in one embodiment. In another embodiment, electronic pourer transmits a timestamp value when the pour occurred, a duration of the pour, and the electronic identification data upon completion of the pour. In yet another embodiment, a binary flag is transmitted instead of one or more timestamp values, and in such an embodiment, the external computing device saves the timestamp (from its own clock) based on when the binary flag is received. Any of these embodiments can be implemented at 407. At 409, the pour related data is saved to the database. At 411, a deactivation timestamp and/or binary flag is received is received, the deactivation information indicating that the electronic device has been decoupled from the bottle or container. At 413, the deactivation information is saved to the database.

Figure 5:
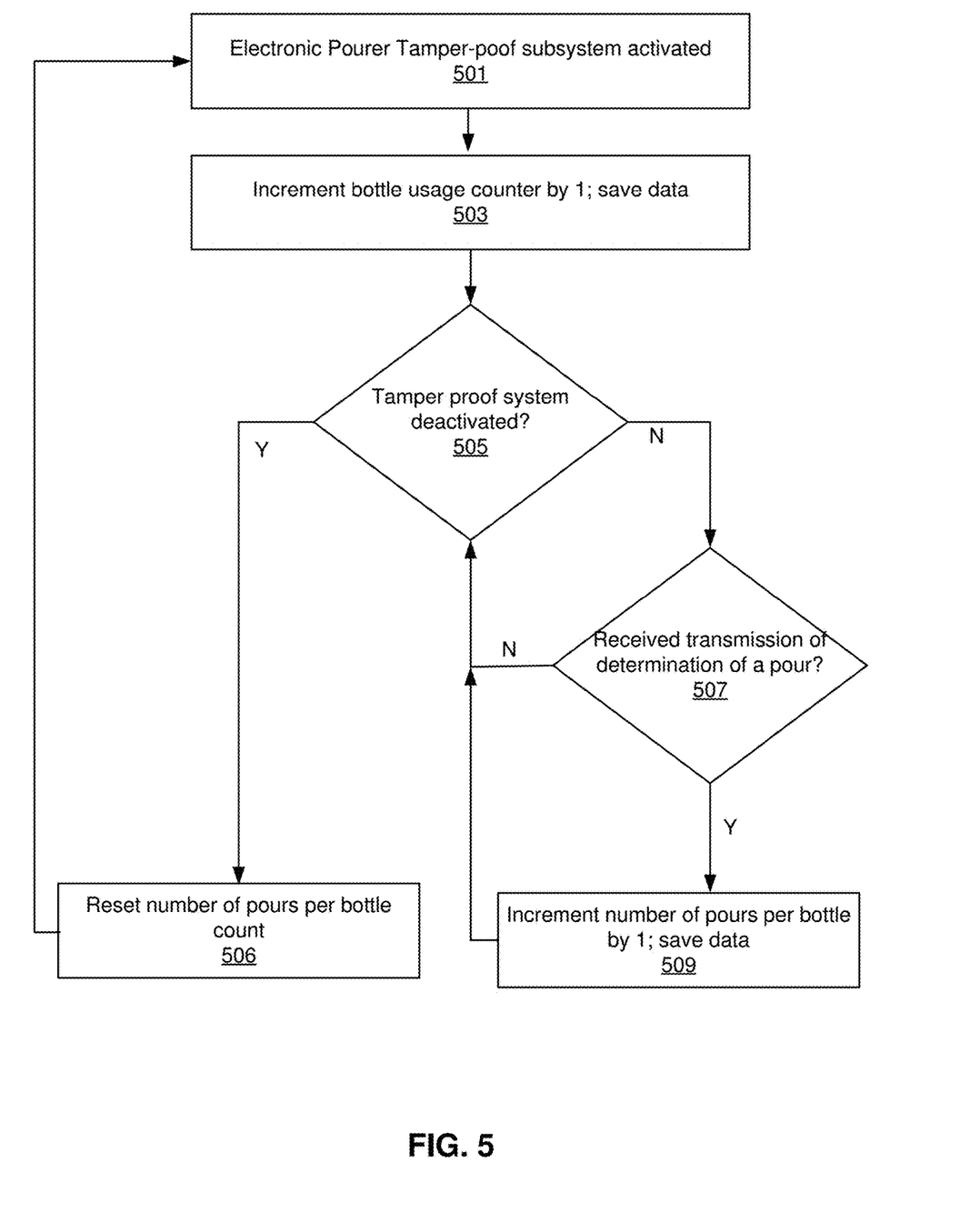
FIG. 5 illustrates a flow diagram of inventory tracking by using an electronic pourer, according to one embodiment of the present invention.

FIG. 5 illustrates a flow diagram of inventory tracking by using an electronic pourer, according to one embodiment of the present invention. As illustrated, at 501, inventory system locates a first timestamp when electronic pourer tamper-proof subsystem was activated and a connection was established with external computing device. Based on the electronic pourer identification data the system is able to determine the bottle of spirit/liquor associated electronic pourer. Since, in one embodiment, the electronic pourer provides tamper-proof functionality, any timestamp indicating an activation data, as illustrated at 503, signifies that the pourer has been coupled to a new bottle of liquor/spirit. At 505, the system determines if the next timestamp at which data was received and determines whether it is associated with deactivation data to signify that the electronic pourer has been decoupled from the bottle. In one embodiment, this occurs when the tamper-proof subsystem is deactivated in the electronic pourer. If the determination at 505 is false, then at 507 the system determines whether the data associated with the next timestamp a pour action occurred (by searching for pour data associated with the electronic pourer). If pour data is available, at 509, a number of pours per bottle is incremented and saved to the database; control is passed back to 505, as described above. If data associated with the next timestamp is not pour related data, at 507, control is passed back to 505 where it is determined whether data associated with the next timestamp is associated with deactivation data. When at 505, it is determined that data associated with the next timestamp relates to deactivation of tamper-proof subsystem, at 506, the number of pours per bottle value is reset and control passes back to the operation associated with block 501, as described above.

It is expected that the inventory system will be performing the above operations continuously, so that data provided by electronic pourer is analyzed in real-time. It should be noted, that since, at 509, the number of pours per bottle is being saved, in case of intentional deactivation of the tamper switch the number of pours per bottle would be less than expected. In such a case, a notification can be transmitted, in one embodiment, by inventory system to an administrative user of the system indicating that tampering of a bottle has occurred as further described herein.

Figure 6:
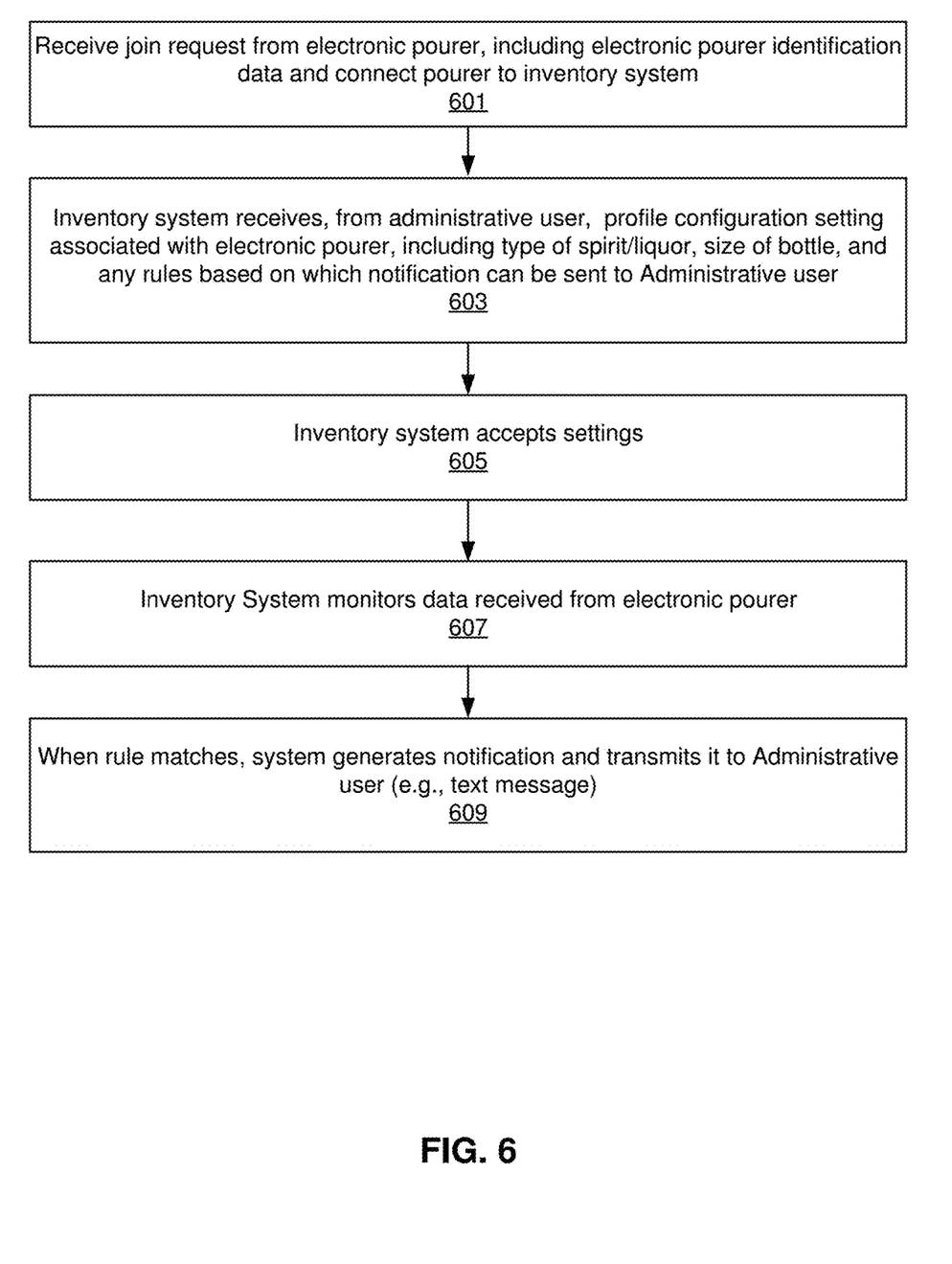
FIG. 6 illustrates a flow diagram describing the operations of initializing and configuring an electronic pourer with an inventory system, according to one embodiment of the present invention.

FIG. 6 illustrates a flow diagram describing the operations of initializing and configuring an electronic pourer with an inventory system, according to one embodiment of the present invention. As illustrated, at 601, a request to join electronic pourer with inventory system is received. In one embodiment, at 603, inventory system receives profile configuration settings associated with electronic pourer, including the type of spirit/liquor, size of the bottle, and any rules based on which notification can be sent to the administrative user. As 605, the inventory system accepts the settings and the electronic pourer is ready to be activated (by coupling it with a bottle). At 607, inventory system reads data provided by electronic pourer. In one embodiment, inventory system analyzes the information provided by electronic pourer in real-time. In another embodiment, inventory system analyzes electronic pourer data at a predetermined period of time. At 608, when inventory system determines that a rule or event trigger is matched, the system generates notification and transmits it to an administrative user or manager.

For example, in case electronic pourer is associated with a 750 ml bottle of Vodka, approximately twenty (20) 1.25 ounce shots are to be expected. In this scenario, a manager can set a rule of receiving a notification if pour count per bottle is less than 17. Thus, in case electronic tampering subsystem is deactivated before the bottle pour count reaches 17 a notification of tampering can be sent to the administrative user or manager. Similarly, a rule for overpouring can be set based on the duration of each pour. Each notification alert transmitted to a manager or administrative use can include the timestamp of occurrence of the event or rule trigger. This timestamp can value assist a manager to determine the employee whose actions resulted in the rule trigger/event, when combined with a camera monitoring system. Once a timestamp value is received, the manager can observe the event using a conventional camera system recording the actions of the employee.

Figure 7:
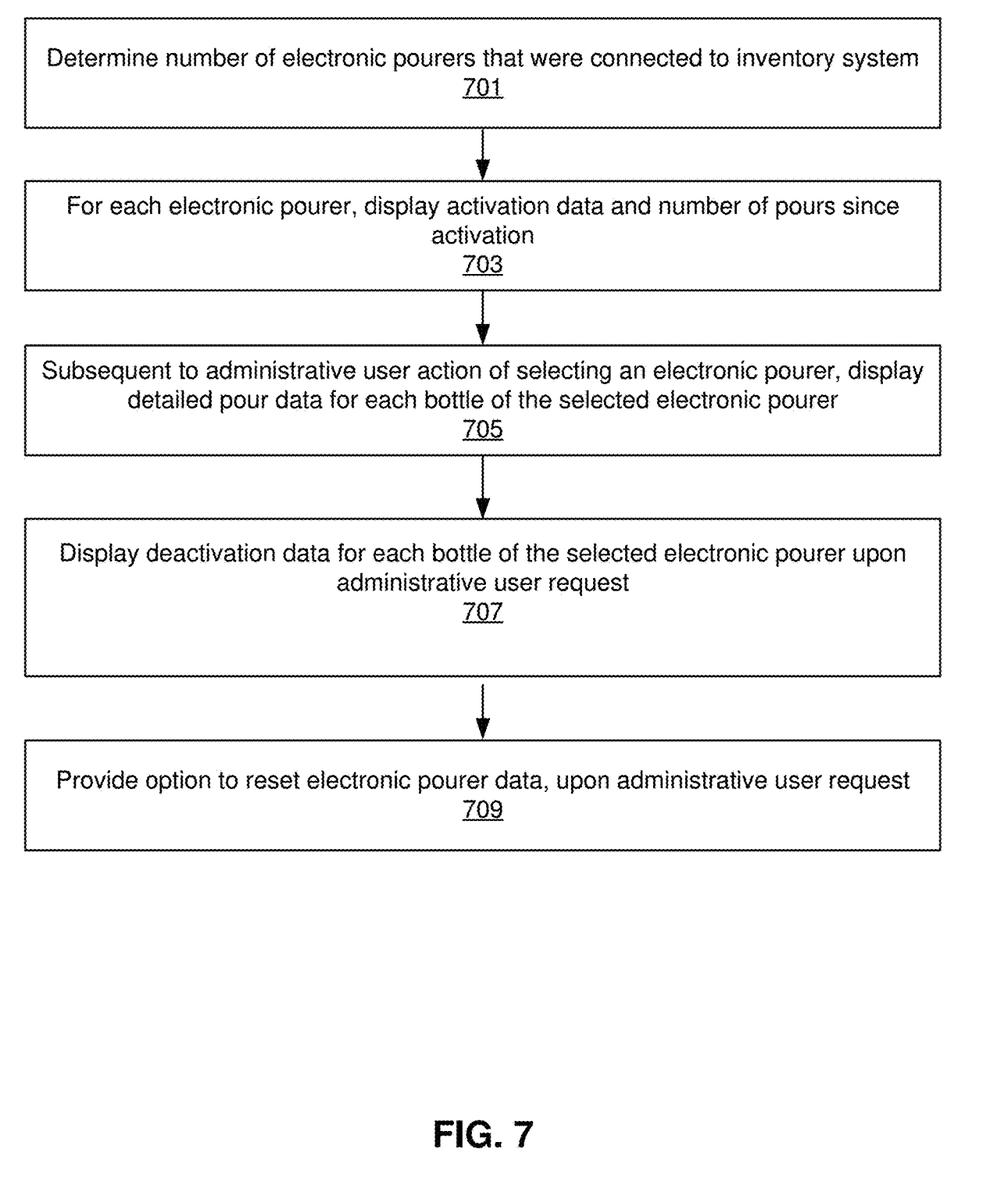
FIG. 7 illustrates the operations of presenting analyzed electronic pourer data by inventory system, according to one embodiment of the present invention.

FIG. 7 illustrates the operations of presenting analyzed electronic pourer data by inventory system, according to one embodiment of the present invention. As illustrated, at 701, the number of electronic pourers associated with inventory system are determined and listed to an administrative user via a graphical user interface. At 703, for each electronic pourer, the system displays identification data, including human readable tag or information (as set by administrative user, in one embodiment), activation related data, and a number of pour actions since activation occurred. At 705, subsequent to user action of selecting an electronic pourer, details pour data, including activation, pour data, and deactivation information, associated timestamps, duration of each pour, number of bottles used, and/or number of pours per bottle can be displayed to the user. Generally, any electronic pourer data saved in the database can be used to calculate charts, diagrams, or any analysis, as known to a person of ordinary skill in the art.

In one embodiment, at 707, activation data for each bottle associated with electronic pourer can be displayed, upon request. At 709, the administrative panel permits an authorized user to reset electronic pourer data and change or reset electronic pourer configuration settings, as desired.

Figure 8:
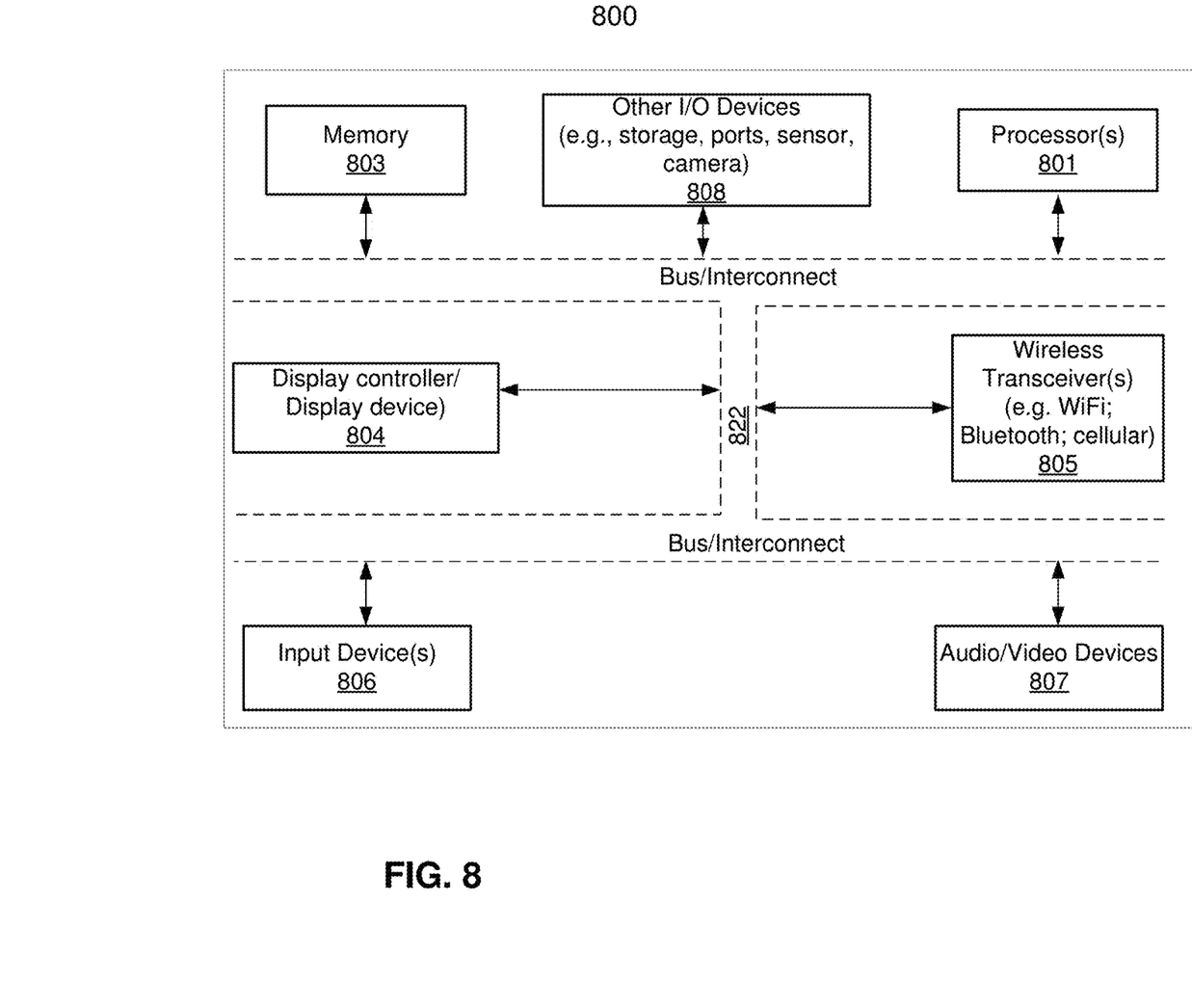
FIG. 8 is a block diagram illustrating a data processing system such as a computing system which can be used with one embodiment of the invention.

FIG. 8 is a block diagram illustrating a data processing system such as a computing system 800 which can be used with one embodiment of the invention. For example, system 800 can be implemented as part of an electronic pourer 101, external computing device 209, and/or any computing device configured as an inventory system used with any embodiment described herein. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

System 800 can have a distributed architecture having a plurality of nodes coupled through a network, or all of its components may be integrated into a single unit. Computing system 800 can represent any of the data processing systems described above performing any of the processes or methods described above. In one embodiment, computer system 800 can be implemented as integrated circuits (ICs), discrete electronic devices, modules adapted to a circuit board such as a motherboard, an add-in card of the computer system, and/or as components that can be incorporated within a chassis/case of any computing device. System 800 is intended to show a high level view of many components of any data processing unit or computer system. However, it is to be understood that additional or fewer components may be present in certain implementations and furthermore, different arrangement of the components shown may occur in other implementations. System 800 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 800 includes processor 801, memory 803, and devices 805-808 via a bus or an interconnect 822. Processor 801 can represent a single processor or multiple processors with a single processor core or multiple processor cores included therein. Processor 801 can represent one or more general-purpose processors such as a microprocessor, a central processing unit (CPU), Micro Controller Unit (MCU), etc. Processor 801 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 801, can also be a low power multi-core processor socket such as an ultra low voltage processor, may act as a main processing unit and central hub for communication with the various components of the system. Such processor can be implemented as a system on chip (SoC). Processor 801 is configured to execute instructions for performing the operations and methods discussed herein. System 800 further includes a graphics interface that communicates with graphics subsystem 804, which may include a display controller and/or a display device.

Processor 801 can communicate with memory 803, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 803 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 803 may store information including sequences of executable program instructions that are executed by processor 801, or any other device. System 800 can further include IO devices such as devices 805-808, including wireless transceiver(s) 805, input device(s) 806, audio IO device(s) 807, and other IO devices 808.

Wireless transceiver 805 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 806 can include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). Other optional devices 808 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 808 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 822 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, in one embodiment, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, using multiple embodiments, methods, apparatuses, devices, and computer readable medium to implement an electronic pourer are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An inventory system comprising:
    an electronic pourer, configured to:
        transmit a first notification when the electronic pourer is coupled to a container, wherein the first notification includes a unique electronic pourer identification value,
        transmit a second notification when it is determined that a pour has occurred through the tamper proof electronic pourer, and
        transmit a third notification when the electronic pourer is decoupled from the container; and
    a computing device paired with the electronic pourer, configured to:
        register the electronic pourer as active upon receiving the first notification, wherein the register includes incrementing a value of a container usage counter, the value of the container usage counter queried from a database coupled to the computing device, increment a pour counter when it is determined that the electronic pourer has transmitted the second notification, reset the pour counter when it is determined that the electronic pourer has transmitted the third notification.

2. The system of claim 1, further comprising:

a notification subsystem configured to transmit a message to a user; and wherein the computing device is further configured to transmit the message, using the notification subsystem, to the user based on a set of configurable rules.

3. The inventory system of claim 2, wherein the set of configurable rules includes at least one of when the pour counter has reached a predetermined number or when the third notification is received prior to the predetermined number, wherein the predetermined number can be configured by the user.

4. The inventory system of claim 2, wherein the set of configurable rules includes a determination that an over-pour has occurred, wherein the determination can be made based on a duration of each pour, the duration of each pour configurable by the user.

5. The inventory system of claim 2, wherein the message includes a timestamp value.

6. The inventory system of claim 1, further comprising:

a graphical user interface configured to display a set of electronic pourers associated with the inventory system, wherein the set of electronic pourers includes the electronic pourer, and wherein a user can select the electronic pourer to view electronic pourer event information associated with the electronic pourer by selecting it on the graphical user interface.

7. The inventory system of claim 6, wherein subsequent to user action of selecting the electronic pourer, the graphical user interface displays details related to electronic pourer event information, the electronic pourer event information including activation information, pour information, and deactivation information, each electronic pourer event information associated with its respective timestamp, wherein each associated timestamp is determined by the computing device on receipt of each respective notification.

8. The inventory system of claim 6, wherein activation information associated with electronic pourer can be displayed on the graphical user interface through an administrative panel.

9. The inventory system of claim 1, wherein electronic pourer data from the electronic pourer is saved in the database and can be used to calculate at least one of charts, diagrams, or perform analysis.

10. The inventory system of claim 1, wherein the electronic pourer transmits a pairing request to connect to the computing device through a network.

11. A method, comprising:

registering, by a computing device, an electronic pourer as active upon receiving a first notification, wherein the register includes incrementing a value of a container usage counter, the value of the container usage counter queried from a database coupled to the computing device, wherein the first notification is transmitted by the electronic pourer when it is coupled to a container;

incrementing a pour counter when it is determined that the electronic pourer has transmitted a second notification, wherein the second notification is transmitted by the electronic pourer on when it is determined that a pour has occurred; and resetting the pour counter when it is determined that the electronic pourer has transmitted a third notification, wherein the third notification is transmitted when the electronic pourer is decoupled from the container.

12. The method of claim 11, further comprising:

transmitting a message to a user based on a set of configurable rules.

13. The method of claim 12, wherein the set of configurable rules includes at least one of when the pour counter has reached a predetermined number or when the third notification is received prior to the predetermined number, wherein the predetermined number can be configured by the user.

14. The method of claim 12, wherein the set of configurable rules includes a determination that an over-pour has occurred, wherein the determination can be made based on a duration of each pour, the duration of each pour configurable by the user.

15. The method of claim 12, wherein the message includes a timestamp value.

16. The method of claim 11, further comprising:

a graphical user interface configured to display a set of electronic pourers associated with the method, wherein the set of electronic pourers includes the electronic pourer, and wherein a user can select the electronic pourer to view electronic pourer event information associated with the electronic pourer by selecting it on the graphical user interface.

17. The method of claim 16, wherein subsequent to user action of selecting the electronic pourer, the graphical user interface displays details related to electronic pourer event information, the electronic pourer event information including activation information, pour information, and deactivation information, each electronic pourer event information associated with its respective timestamp, wherein each associated timestamp is determined by the computing device on receipt of each respective notification.

18. The method of claim 16, wherein activation information associated with electronic pourer can be displayed on the graphical user interface through an administrative panel.

19. The method of claim 11, wherein electronic pourer data from the electronic pourer is saved in the database and can be used to calculate at least one of charts, diagrams, or perform analysis.

20. The method of claim 11, wherein the electronic pourer transmits a pairing request to connect to the computing device through a network.

* * * * *

UNITED STATES PATENT AND TRADEMARK OFFICE
CERTIFICATE OF CORRECTION

PATENT NO. : 10,597,281 B2
APPLICATION NO. : 15/413373
DATED : March 24, 2020
INVENTOR(S) : Rohit Chhabra Page 1 of 1

It is certified that error appears in the above-identified patent and that said Letters Patent is hereby corrected as shown below:

In the Claims

At Column 12, Lines 56 to 58, delete the following text from Claim 1:
"transmit a second notification when it is determined that a pour has occurred through the tamper proof electronic pourer, and"
And insert the following:
--transmit a second notification when it is determined that a pour has occurred through the electronic pourer, and--

Signed and Sealed this
Second Day of June, 2020

Andrei Iancu
*Director of the United States Patent and Trademark Office*